United States Patent
Srinivasan (10) Patent No.: US 10,594,872 B1
(45) Date of Patent: Mar. 17, 2020

(54) SYSTEMS AND METHODS FOR WIRELESS NETWORK SERVICE PROVIDER SELECTION

(71) Applicant: Honeywell International Inc., Morris Plains, NJ (US)

(72) Inventor: Divya Swarup Giriyappa Srinivasan, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/143,982

(22) Filed: Sep. 27, 2018

(51) Int. Cl.
*H04M 15/00* (2006.01)
*H04W 48/18* (2009.01)

(52) U.S. Cl.
CPC ....... *H04M 15/8044* (2013.01); *H04M 15/61* (2013.01); *H04W 48/18* (2013.01)

(58) Field of Classification Search
CPC ......... H04W 72/0486; H04W 72/0493; H04W 48/18; H04W 74/02; H04M 3/42068; H04M 3/4211; H04M 3/42289; H04M 15/745
See application file for complete search history.

(56) References Cited

U.S. PATENT DOCUMENTS

| | | | |
|---|---|---|---|
| 9,881,022 B2 | 1/2018 | Ubhi et al. | |
| 9,967,172 B2 | 5/2018 | Kao et al. | |
| 2007/0027589 A1* | 2/2007 | Brinkley | G08G 5/0013 701/3 |
| 2010/0099378 A1* | 4/2010 | Amato | G06Q 20/102 455/408 |
| 2010/0110890 A1* | 5/2010 | Rainer | H04M 15/00 370/232 |
| 2012/0190353 A1* | 7/2012 | Harwell | H04W 4/02 455/422.1 |
| 2018/0027465 A1 | 1/2018 | Karlsson | |
| 2018/0132173 A1 | 5/2018 | Miramonti et al. | |
| 2018/0137500 A1* | 5/2018 | Greene | G06Q 20/363 |

* cited by examiner

*Primary Examiner* — Charles N Appiah
*Assistant Examiner* — Xiang Zhang
(74) *Attorney, Agent, or Firm* — Fogg & Powers LLC (57) ABSTRACT

Systems and methods for wireless network service provider selection are provided. In one embodiment, a method comprises: determining when there is there a positive balance of an unutilized allowance for at least one of a plurality of available wireless network service providers; when there is a positive balance of an unutilized allowance, designating one service provider from the plurality of available wireless network service providers as a selected wireless network service provider based at least in part on the unutilized allowance; and adjusting operation of one or more radio communication transceivers to establish a communication link via the selected wireless network service provider.

17 Claims, 4 Drawing Sheets

SYSTEMS AND METHODS FOR WIRELESS NETWORK SERVICE PROVIDER SELECTION

BACKGROUND

Airlines utilize avionic datalink service providers, such as Aeronautical Radio, Incorporated (ARINC) GLOBALink and SITA's ATS AirCom system, to connect with aircraft communications addressing and reporting system (ACARS) data and voice services in much the same manner as cellular device users connect via their cellular network provider to access voice and data telecommunications networks and to access content available from data services via the Internet. Moreover, avionic datalink service providers will often provide incentives for airlines to subscribe to their network, such as lower data use rates and free data use allocations, often based on factors such as the airlines' fleet size, with heavy data users provided greater incentives. Because aircraft frequently travel across different geographic regions, where different avionic datalink service providers operate, on-board communications equipment may include devices that communicate with, or can be reconfigured to communicate with, different avionic datalink service providers depending on what networks are in range for use. As such, there are some regions that include overlapping avionics networks, where an aircraft may be able to select which network to use to communicate ACARS messaging and other voice and data transfers. One problem associated with avionic datalink services is their cost to the airlines and a lack of ability for on-board communications management equipment to dynamically incorporate network service provider incentives when establishing datalinks.

For the reasons stated above and for other reasons stated below which will become apparent to those skilled in the art upon reading and understanding the specification, there is a need in the art for systems and methods for wireless network service provider selection.

SUMMARY

The Embodiments of the present disclosure provide systems and methods for wireless network service provider selection and will be understood by reading and studying the following specification.

In one embodiment, a method for a mobile communication system comprises: Systems and methods for wireless network service provider selection are provided. In one embodiment, a method comprises: determining when there is there a positive balance of an unutilized allowance for at least one of a plurality of available wireless network service providers; when there is a positive balance of an unutilized allowance, designating one service provider from the plurality of available wireless network service providers as a selected wireless network service provider based at least in part on the unutilized allowance; and adjusting operation of one or more radio communication transceivers to establish a communication link via the selected wireless network service provider.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure provide systems and methods for communications systems for mobile platforms, such as but no limited to aircraft. These embodiments incorporate allowances, such as network service provider incentives, into the decision of selecting a wireless network service providers. In some embodiments, the selection may include dynamically calculating preference rankings for available wireless service providers that incorporate network service provider allowances into the decision of selecting a wireless network service providers. The embodiments described herein provide for cost efficient selections based on customizable factors including network subscription contract plans and incentives and aircraft equipage by specifically considering allowance incentives and the balance of unutilized allowance available for each network provider. In some implementations of the embodiments described herein, this allowance, or some portion thereof, may be a "free allowance" meaning that it is provided purely as an incentive a complementary service usage by wireless service provides. Likewise, the allowance, or some portion thereof, may be a purchased allowance (for example, obtained by a vehicle fleet operator) to secure a quantity of service usage.

Figure 1:
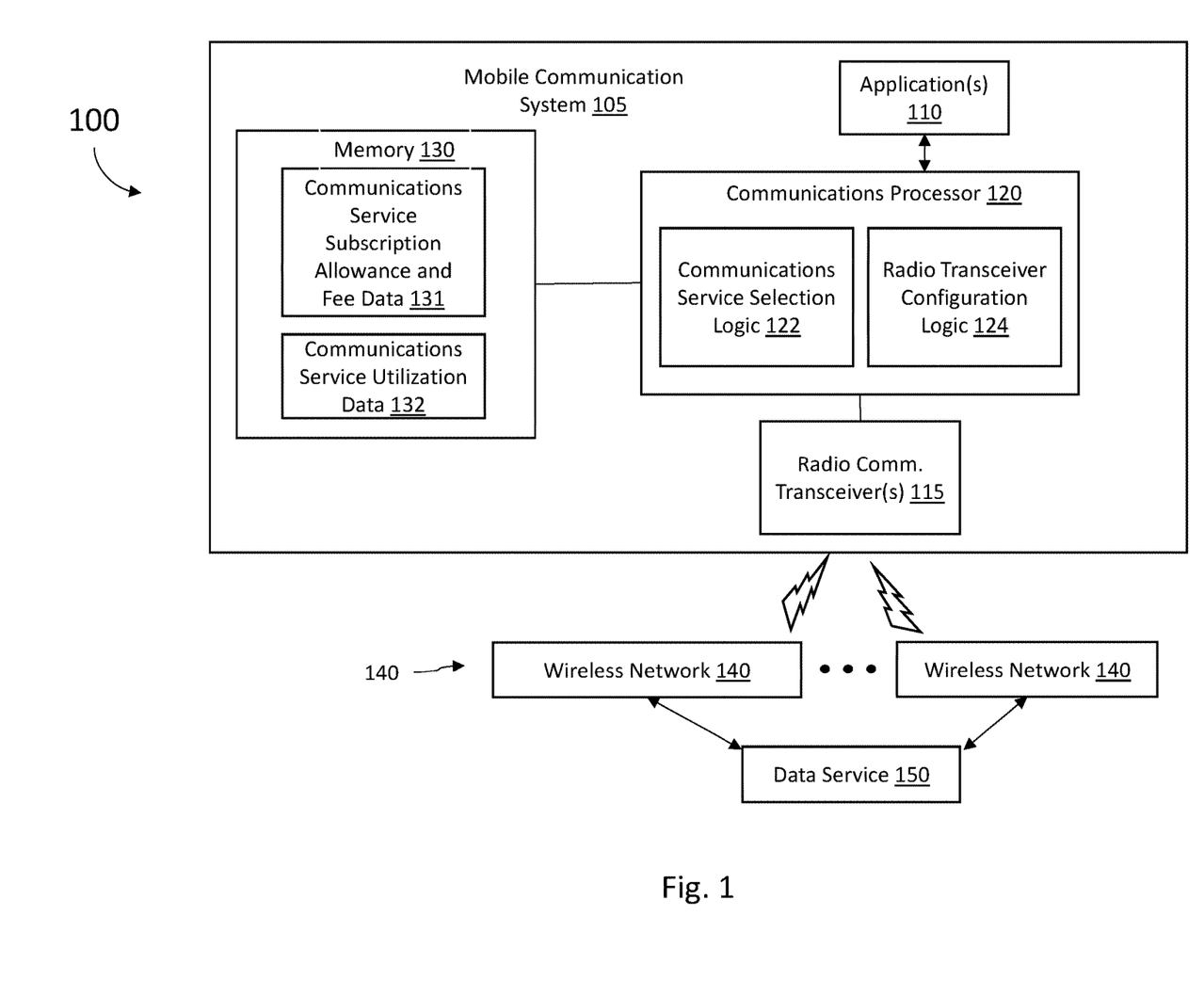
FIG. 1 is a block diagram illustrating a mobile platform that includes a mobile communication system of one embodiment of the present disclosure.

FIG. 1 is a diagram illustrating a mobile platform 100 that includes a mobile communication system 105 of one embodiment of the present disclosure. As described in greater detail below, the mobile communication system 105 functions to determine a most cost effective communication link solution for wirelessly transporting data between one or more applications 110 being executed on the mobile platform 100 and a data service 150 external to the mobile platform 100.

As the term is used herein, a mobile platform 100 is intended to encompass any form of non-stationary device, system or equipment. For example, in some embodiments, the mobile platform may comprise a personal device such as a cellular telephone, computer tablet or computer laptop, or portable radio equipment, for example. In other embodiments, the mobile platform 100 may comprise a vehicle, such as but not limited to a truck, train, automobile, boat, ship, watercraft, aircraft, or spacecraft, for example, that comprises integrated communications systems as part of the vehicle. As such the mobile communication system 105 may comprise a communications processor 120 and memory 130 that execute code to implement one or more functions to provide for routing and processing data communications between applications 110 and the data service 150. It should be understood that in some embodiments, applications 110 may be executed by the communications processor 120, while in other embodiments, applications 110 may be executed by a processor distinct and separate from the communications processor 120.

As the terms are used herein, "data", "data communications", and "messages" are intended to include all forms data, including data conveying voice and video communications, as well as messages and data used for operating or otherwise monitoring aspects of the mobile platform 110 itself or its various sub-systems. For example, for embodiments where the mobile platform 100 comprises an aircraft, the mobile communication system 105 described herein may comprise and be implemented by the on-board Communications Management Unit (CMU) or Communications Management Function (CMF) of that aircraft.

Figure 2:
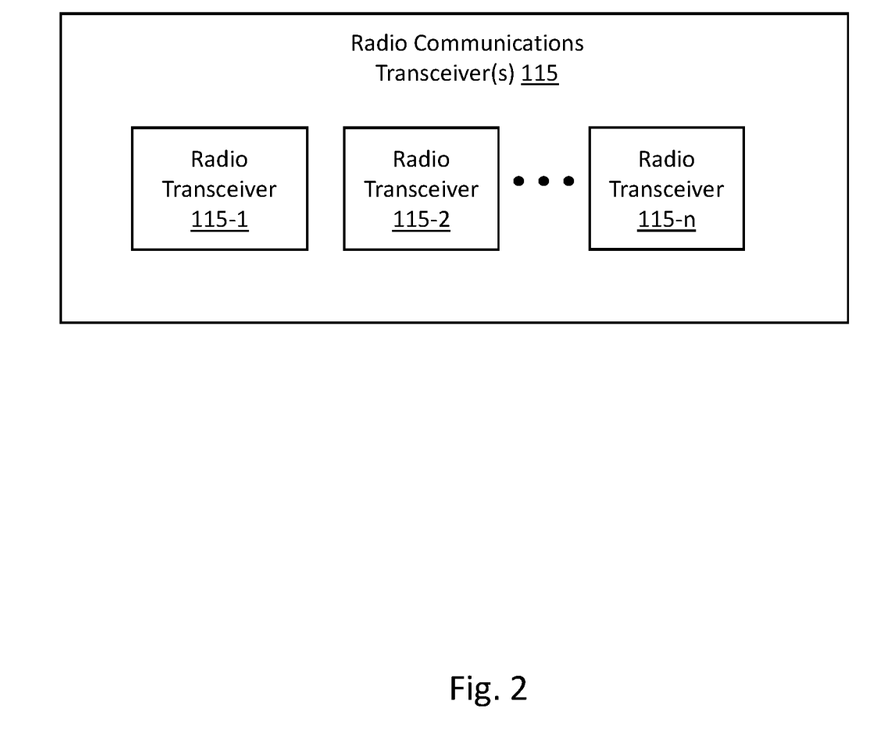
FIG. 2 is a block diagram illustrating radio communication transceivers one embodiment of the present disclosure.

In the embodiment shown in FIG. 1, the mobile communication system 105 comprises the communications processor 120 and memory 130. The communications processor 120 is coupled to one or more wireless radio communications transceivers 115 and may send/receive communications data to/from data services 150 via the radio communications transceivers 115, as well as control and configure operation of the radio communications transceivers 115. In this embodiment, the communications processor 120 comprises and executes communications service selection logic 122 and radio transceiver configuration logic 124. Based on a dynamic ranking of available wireless network service providers generated in real-time by the communications service selection logic 122, the radio transceiver configuration logic 124 sends control signals to the radio communication transceiver(s) 115 to adjust or otherwise configure operation of the radio communication transceiver(s) 115 to utilize the wireless network service provider selected by the communications service selection logic 122 to establish a communication link between the mobile platform 100 and the data service 150. That is, as shown in FIG. 1 generally at 140, there may exist a plurality of different wireless network service providers available for the purpose of communicating with data service 150. For example, for embodiments where the mobile platform 100 comprises a cellular phone, the wireless network service provides 140 may comprise cellular communication service providers that provide subscription based cellular service to user devices in the region where the mobile platform 100 is currently located. For embodiments where the mobile platform 100 comprises an aircraft, the wireless network service providers 140 may comprise radio networks (including but not limited to high frequency (HF), very high frequency (VHF) and satellite communication networks) that provide subscription based avionics communications services in the region where the aircraft is currently operating. It should be appreciated that the wireless network service providers 140 for any embodiment describe herein may also comprise non-industry specific services, including WiFi (IEEE 802.11) or Bluetooth (IEEE 802.15) based services provided via wireless network access points or "Hot Spots", for example. In other embodiments, the radio communication transceiver(s) 115 may implement other standards such as, but not limited to, High Frequency Data Radio (HFDR), Gatelink technology, SwiftBroadband (SBB), ACARS-over-Internet Protocol (AoIP), a cellular telephone technology, Aeronautical Mobile Airport Communication System (AeroMACS), or a proprietary network technology, and the like In some embodiments, the radio communication transceiver(s) 115 may comprise a single radio equipment device that may be tuned to a specific communications channel associated with any of the wireless network service providers 140. For example, the radio transceiver configuration logic 124 may send a control signal to the radio communication transceiver 115 that reconfigures the radio equipment to use a designated frequency (or set of frequencies) and modulation protocol specific to the wireless network 140 selected by the communications service selection logic 122. In other embodiments, the radio communication transceiver(s) 115 may comprise multiple (i.e., a plurality of) radio equipment devices. This is illustrated in FIG. 2, wherein the radio communication transceiver(s) 115 include a plurality of distinct radio equipment devices (115-1 to 115-n). For example, in some embodiments, radio equipment device 115-1 may comprise a radio that operates over the HF and/or VHF bands, while radio equipment device 115-2 operates over satellite communications bands. In some embodiments, one or more of the radio equipment devices (115-1 to 115-n) may operate over WiFi or Bluetooth radio frequency channels. Accordingly, in some such embodiments, the radio transceiver configuration logic 124 send control signals to either initialize radio equipment, deactivate radio equipment, and/or otherwise routes communications to a selected one of the plurality of radio equipment devices to establish communication with the wireless network 140 selected by the communications service selection logic 122. This selection may also include sending a control signal to the one of the plurality of radio equipment devices to reconfigure that radio equipment device to use a designated frequency (or set of frequencies) and modulation protocol specific to the wireless network 140 selected by the communications service selection logic 122.

As described below, when an application 110 initiates a communications session to exchange downlink and/or uplink messages with the data service 150, the communications service selection logic 122 determines the most cost effective communications service (i.e. the most cost effective wireless network service) to use for that message exchange based on a combination of communications service subscription allowance and fee data 131 and communications service utilization data 132 stored in memory 130. The communications service subscription allowance and fee data 131 represents terms of service associated with each of the wireless network service providers 140, including both applicable cost per data unit usage fees (e.g., cost per kilo bit) and allowance (e.g. kilo bits) that might be granted to the user as part of the service provider subscription. The communications service utilization data 132, in comparison, indicates how much of the allowance has been consumed, and accordingly how much allowance remains available from each wireless network service providers 140 providing an allowance. In some embodiments, the communications service utilization data 132 may be updated by the communications processor 120 in real time, so that as radio communications are conducted via a wireless network service provider 140, consumption of any allowance associated with that provider is accounted for in the communications service utilization data 132.

As mentioned above, embodiments of the present disclosure address the problem of reducing messaging and data communication costs by routing downlink and/or uplink communications via the wireless network provider 140 that is most cost effective in terms of both allowance utilization and cost per data unit. This determination is made in real-time by the communications service selection logic 122 by dynamically calculating a network preference ranking for each of the network providers 140 available for use at the time the communication is to be performed.

Generally, if the communications service selection logic 122 determines that there is unutilized allowance available from an available network, then it will be predisposed to use it before opting for a network where a data fee will be incurred. As the term is used herein, an "available network" is a wireless network within range of the mobile platform 100 and to which the mobile communication system 105 has a valid subscription for obtaining network services. In some embodiments, when unutilized allowance is available from more than one available network, then the communications service selection logic 122 designates the one service provider with the most unutilized allowance to be the selected wireless network service provider. In some embodiments, the communications service selection logic 122 may optionally rank the networks with unutilized allowance in an order that is a function at least partially based on which service provides has more unutilized allowance as indicated by the communications service utilization data 132. In some embodiments, designation of the selected wireless network service provider may include additional factors or considerations in addition to the amount of unutilized allowance. For example, the decision may be a function of both unutilized allowance and allowance expiration information. That is, the communications service selection logic 122 may determine that although a wireless network service provider does not have the most unutilized allowance, the unutilized allowance is scheduled to expire soon (within a predetermined time period, such as within the next 24 hours for example), or is otherwise scheduled to expire before the unutilized allowance of another wireless network service provider that has more unutilized allowance is scheduled to expire. In that case. In such cases, the communications service selection logic 122 may be configured to prefer using unutilized allowance based on forthcoming expiration rather than just quantity remaining.

In some embodiments, the unutilized allowance for a given wireless network may be dynamically calculated as function of the percentage of a total allowance allocation and the utilization data for that wireless network. In some embodiment, unutilized allowance is calculated as a percentage of a total allowance allocation. For example, in one embodiment, a first network service provider may provide a total allowance allocation of 900,000 Kilobits for the current subscription period, and 600,000 Kilobits of that total allowance are used. The unutilized allowance for this first network service provider could then be calculated as 600,000/900,000 or 33%. A second network service provider may provide a total allowance allocation of 1,200,000 Kilobits for the current subscription period, and 1,000,000 Kilobits of that total allowance are used. The unutilized allowance for this first network service provider could then be calculated as 1,000,000/1,200,000 or 17%. The first network service provider would then be ranked higher than the second network service provider because it has the greater unutilized allowance. In some circumstances, such as at the beginning of a subscription period where no allowance has yet been utilized, the first and second network service providers may both have the same unutilized allowance values. In that case, the network service provider offering the highest total allowance allocation (which in this example would be the second network service provider) would be ranked higher than those with a lesser total allowance allocation. As such, the communications service selection logic will ensure that is there is any unutilized allowance remaining for any of the network service providers, it will be exhausted first, before selecting a network service provider that would result in a data usage fee being incurred. Moreover, this scheme inherently provides logic that achieves a degree of load balancing since utilization will be spread evenly rather than waiting for one network's allowance allocation to exhaust before using another networks' allowance allocation.

Once the point is reached where there is no allowance balance available (i.e., the unutilized allowance is 0% for all available wireless network service providers, then the communications service selection logic 122 shifts to instead rank the network service providers based on cost per data unit usage fees. For example, if the first network service provider has a cost per data unit usage fee of $0.31 per kilobit, and the second network service provider has a cost per data unit usage fee of $0.55, then the first network service provider would then be ranked higher than the second network service provider because it has the lower cost per data unit usage fees. In some embodiments, a cost per data unit usage fee schedule for each the network service providers would be included in the communications service subscription allowance and fee data 131 stored in memory 130 and accessible to the communications service selection logic 122.

In some embodiments, the communications service subscription allowance and fee data 131 may be periodically updated (for example, on a daily or some other scheduled basis) to reflect current cost per data unit usage fee schedules and total allowance allocations for each network service provider could potentially be utilized by the mobile platform 100. Moreover, in some embodiments, the allowance allocation provided as an incentive by a network service provider may comprise a fleet wide allowance. In that case, the total allowance allocation stored within the communications service subscription allowance and fee data 131 would represent the portion of that allocation which is available to the mobile platform 100.

Figure 3:
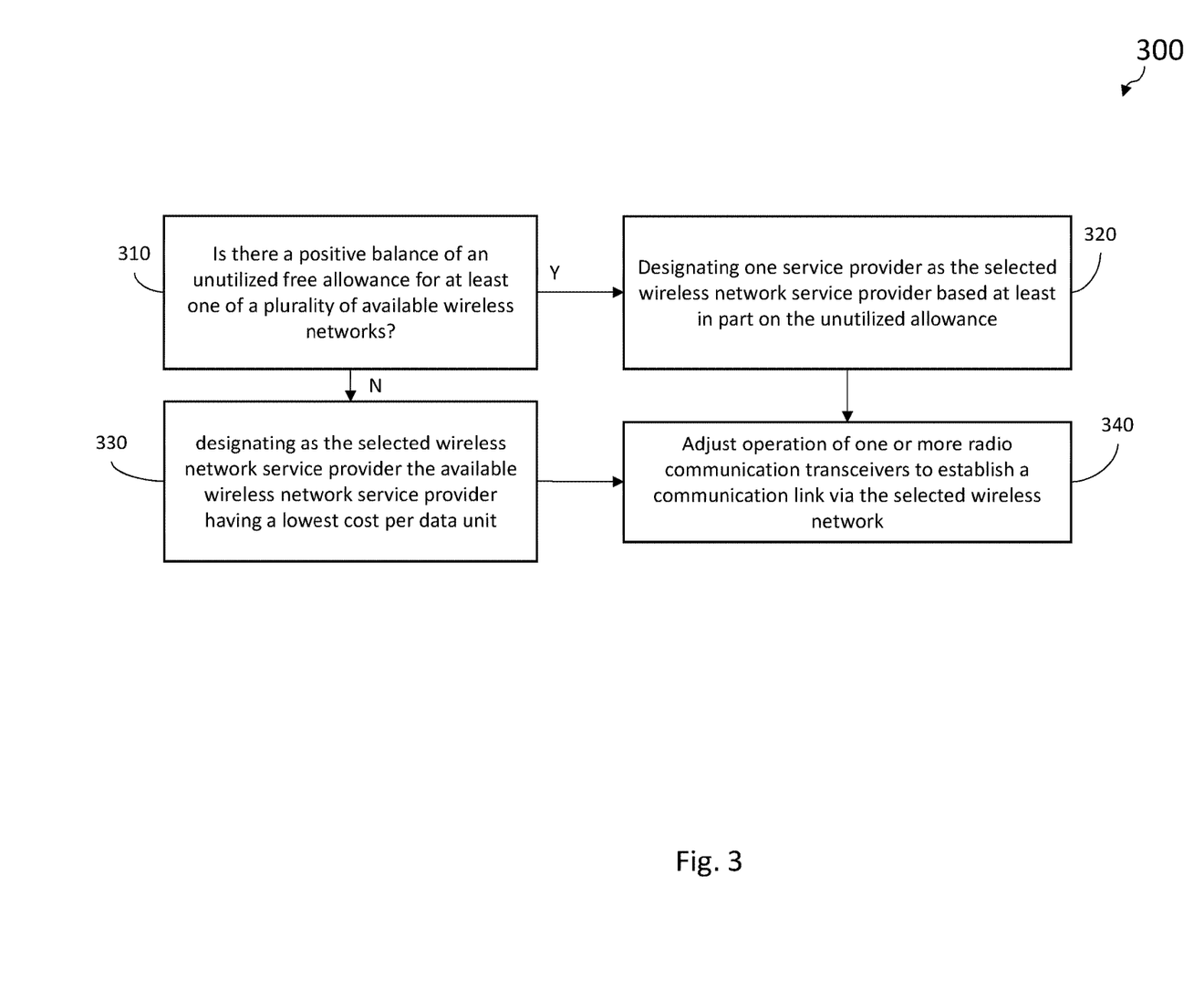
FIG. 3 is a flow chart illustrating a method of one embodiment of the present disclosure.

FIG. 3 is a flow chart for a method 300 of one embodiment of the present disclosure illustrating the process described above with respect to FIG. 1. It should be understood that the features and elements described herein with respect to FIG. 3 may be used in conjunction with, in combination with, or substituted for elements of FIG. 1, as well as any of the other embodiments discussed herein, and vice versa. Further, it should be understood that the functions, structures and other description of elements for embodiments described herein may apply to like named or described elements for any of the Figures and vice versa.

The method 300 begins at 310 with determining where there is there a positive balance of an unutilized allowance for at least one of a plurality of available wireless network service providers. If so, then the method 300 proceeds to 320 with designating one service provider as the selected wireless network service provider based at least in part on the unutilized allowance. This designation may optionally include assigning a network preference ranking to one or more of the respective available wireless network service provider based on the unutilized allowance. As explained above, the available wireless network service provider having the most available unutilized allowance is assigned a highest network preference ranking. The communications service selection logic would designate the available wireless network service provider with the highest network preference ranking as the selected wireless network service provider. If none of the available wireless network service providers has a positive balance of unutilized allowance, then the method 300 instead proceed to 330 with designating as the selected wireless network service provider the available wireless network service provider having a lowest cost per data unit. The may be optionally performed by assigning a network preference ranking to each respective available wireless network service provider based on a cost per data unit. In this case, the available wireless network service provider having the lowest cost per data unit is assigned a highest network preference ranking. Once the selected wireless network service provider service provider has been designated at 320 or 330, the method proceeds to 340 with adjusting operation of one or more radio communication transceivers to establish a communication link via the selected wireless network service provider. As discussed above, the radio communication transceivers may be reconfigured to use a designated frequency (or set of frequencies) and modulation protocol specific to the selected wireless network service provider and/or specific radio equipment associated with the selected wireless network service provider is used to establish communication a communications link with the selected wireless network service provider. More cost effective operation of the mobile platform 100 is thus achieved by method 300 be ensuring that network service providers having unutilized free allocations are utilized when possible over those that will incur data usage fees.

Figure 4:
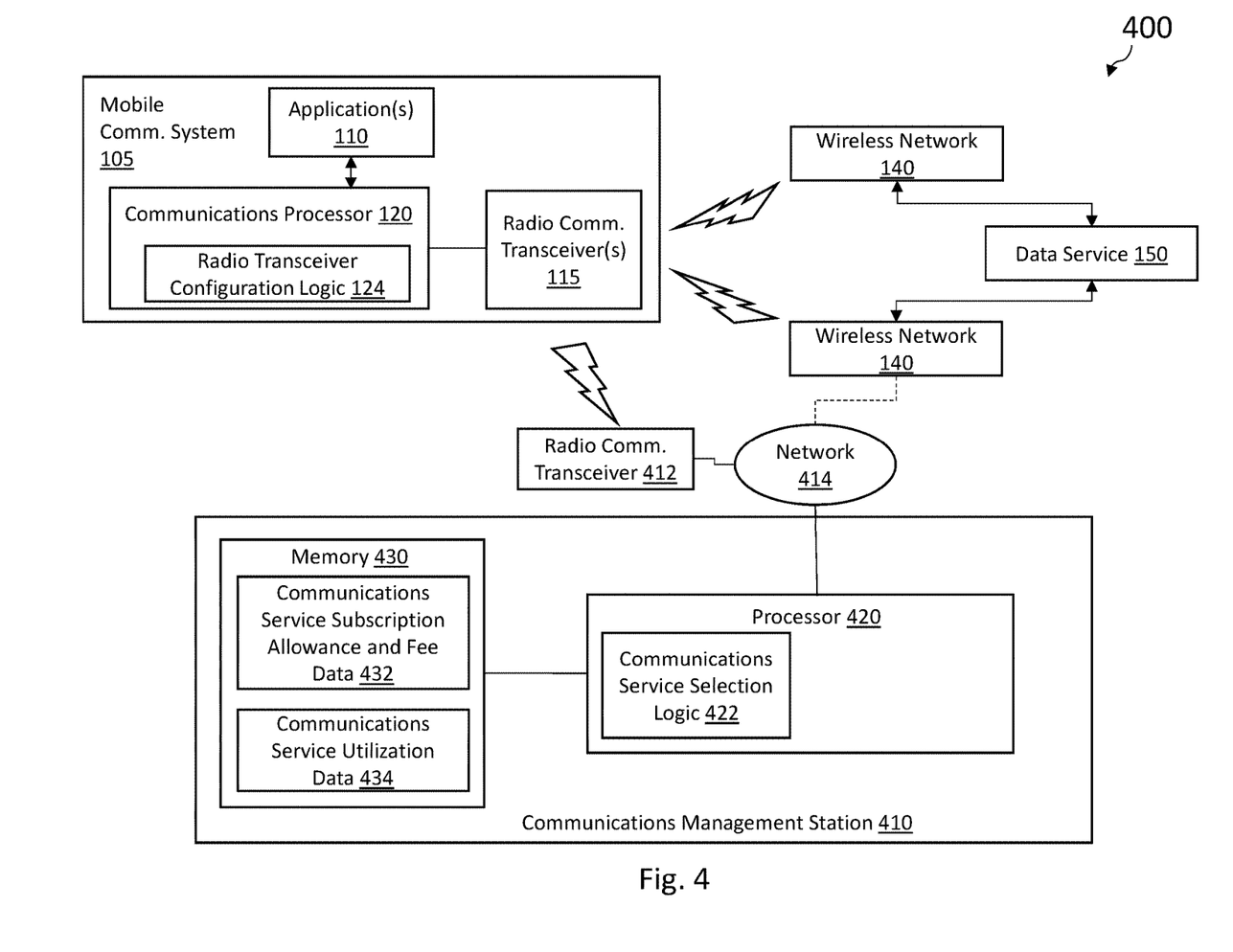
FIG. 4 is a block diagram illustrating an alternate mobile communication system of one embodiment of the present disclosure.

FIG. 4 is a block diagram that illustrates an alternative embodiments where communications service selection logic is not located on the mobile platform 100 or executed by the mobile communication system 105, but is instead offloaded and remotely implemented at a communications management station 410. Such an embodiment may be applicable for applications such as where an operator manages a plurality of mobile platforms, such as an airline that operates a plurality of aircraft. In that case, the communications management station 410 may comprise an airlines operations center. In this embodiment, the communications management station 410 comprises the communications service selection logic 422, which is executed by a processor 420 coupled to a memory 430. Memory 430 stores communications service subscription allowance and fee data 431 and communications service utilization data 432. In one embodiment, the communications service subscription allowance and fee data 431 and communications service utilization data 432 may comprise such data as applicable to the operators fleet, rather than to a specific mobile platform 100. That is, the communications service subscription allowance and fee data 431 would include a total allowance allocation that comprises a total pool of allowance and the communications service utilization data 432 would store usage information across multiple instances of mobile platform 100. The communications service selection logic 422 performs the same logic as described above and illustrated in FIG. 3 to determine which wireless network 140 each mobile platform 105 should be utilizing to establish a communication link with data service 150. This determination may be performed periodically, or some other scheduled basis, or based on a current location of the mobile platform 100. In some embodiments, once a selected wireless network service provider has been designated by the communications service selection logic 422, that decision is communicated to the affected mobile platform 100, for example, via an "autotune" command, or other command.

As shown in FIG. 4, in some embodiments, the communication management station 410 is coupled to a radio communications transceiver 412 through which the communications service selection logic 422 communicates the command with the selected wireless network service provider decision. This radio communications transceiver 412 may be located at the communications service selection logic 422, but may be alternately in communication with the communications service selection logic 422 via a network 414. In some embodiments, the communications management station 410 may communicate with the mobile communication system 105 via a wireless network 140 to which the mobile platform 100 is already connected.

The command with the selected wireless network service provider is received on-board the mobile platform 100 by the mobile communication system 105. In response, radio transceiver configuration logic 124 reconfigures the one or more radio communication transceiver(s) 115 in any of the manners described above to establish the wireless communication link with the wireless network 140 designated as the selected wireless network service provider.

EXAMPLE EMBODIMENTS

Example 1 includes a mobile communication system, the system comprising: a communications processor coupled to a memory; at least one radio communications transceiver coupled to the communications processor, wherein the communications processor is configured to establish a communications link with at least one data service via the at least one radio communications transceiver over a selected wireless network service provider; a communications service selection logic executed by the communication processor, wherein the communications service selection logic dynamically designates the selected wireless network service provider by: determining when there is a positive balance of an unutilized allowance for at least one of a plurality of available wireless network service providers; and when there is a positive balance of unutilized allowance, then the communications service selection logic designates one service provider as the selected wireless network service provider based at least in part on the unutilized allowance; and a radio transceiver configuration logic executed by the communications processor, wherein the radio transceiver configuration logic configures the at least one wireless radio communications transceiver to communicate with the at least one data service using parameters associated with the selected wireless network service provider.

Example 2 includes the system of any of examples 1, wherein when no wireless network service provider of the plurality of available wireless network service providers has a positive balance of unutilized allowance, the available wireless network service provider having a lowest cost per data unit is designated by the communications service selection logic as the selected wireless network service provider.

Example 3 includes the system of any of examples 1-2, further comprising communications service subscription allowance and fee data, wherein the communications service subscription allowance and fee data includes: a total allowance allocation associated with at least one of the plurality of available wireless network service providers; and a cost per data unit usage fee schedule for each of the plurality of available wireless network service providers; wherein the communications service subscription allowance and fee data is either stored in the memory or received via an uplink communication.

Example 4 includes the system of example 3, further comprising communications service utilization data, wherein the communications service utilization data indicates how much of the total allowance allocation has been consumed for the one of the plurality of available wireless network service providers; wherein the communications service utilization data is either stored in the memory or received via an uplink communication Example 5 includes the system of any of examples 1-4, wherein the communications service selection logic designates the selected wireless network service provider further based at least in part on a scheduled expiration of the unutilized allowance.

Example 6 includes the system of any of examples 1-5, wherein the at least one radio communications transceiver comprises at least one of a very high frequency (VHF) transceiver, a satellite communications transceiver, an IEEE 802.11 standard (WiFi) radio, an IEEE 802.15 standard (Bluetooth) radio, a High Frequency Data Radio (HFDR), a Gatelink technology radio, a cellular telephone technology, Aeronautical Mobile Airport Communication System (AeroMACS), or a proprietary network technology.

Example 7 includes the system of any of examples 1-6, wherein the communications processor comprises at least part of either an aircraft communications management function or an aircraft communications management system and the data service comprises an aircraft communications addressing and reporting system (ACARS).

Example 8 includes the system of any of examples 1-7, wherein the radio transceiver configuration logic sends a control signal to the at least one radio communication transceiver that reconfigures the at least one radio communication transceiver use a designated frequency, a designated set of frequencies, or a modulation protocol associated with the selected wireless network service provider.

Example 9 includes a method for a mobile communication system, the method comprising: determining when there is there a positive balance of an unutilized allowance for at least one of a plurality of available wireless network service providers; when there is a positive balance of an unutilized allowance, designating one service provider from the plurality of available wireless network service providers as a selected wireless network service provider based at least in part on the unutilized allowance; and adjusting operation of one or more radio communication transceivers to establish a communication link via the selected wireless network service provider.

Example 10 includes the method example 9, wherein when there is no positive balance of the unutilized allowance, designating as the selected wireless network service provider the available wireless network service provider having a lowest cost per data unit.

Example 11 includes the method of any of examples 9-10, wherein designating one service provider from the plurality of available wireless network service providers as a selected wireless network service provider is further based at least in part on a scheduled expiration of the unutilized allowance.

Example 12 includes the method of any of examples 9-11, wherein determining when there is there a positive balance of an unutilized allowance for at least one of the plurality of available wireless network service providers comprises accessing communications service subscription allowance and fee data stored in a memory and accessing communications service utilization data stored in the memory; wherein the communications service subscription allowance and fee data includes: a total allowance allocation associated with at least one of the plurality of available wireless network service providers; and a cost per data unit usage fee schedule for each of the plurality of available wireless network service providers; and wherein the communications service utilization data indicates how much of the total allowance allocation has been consumed for the one of the plurality of available wireless network service providers.

Example 13 includes the method of any of examples 9-12, wherein the one or more radio communications transceiver comprises at least one of a very high frequency (VHF) transceiver, a satellite communications transceiver, an IEEE 802.11 standard (WiFi) radio, an IEEE 802.15 standard (Bluetooth) radio, a High Frequency Data Radio (HFDR), a Gatelink technology radio, a cellular telephone technology, Aeronautical Mobile Airport Communication System (AeroMACS), or a proprietary network technology.

Example 14 includes the method of any of examples 9-13, wherein the mobile communications system comprises at least part of either an aircraft communications management function or an aircraft communications management system and the data service comprises an aircraft communications addressing and reporting system (ACARS).

Example 15 includes the method of any of examples 9-14, wherein adjusting operation of one or more radio communication transceivers to establish a communication link via the selected wireless network service provider comprises: sending a control signal to the at least one radio communication transceiver that reconfigures the at least one radio communication transceiver to use a designated frequency, a designated set of frequencies, or a modulation protocol associated with the selected wireless network service provider.

Example 16 includes a mobile communication system, the system comprising: a mobile platform that comprises: a first processor coupled to a first memory; at least one radio communications transceiver coupled to the communications processor, wherein the communications processor is configured to establish a communications link with at least one data service via the at least one radio communications transceiver over a selected wireless network service provider; a radio transceiver configuration logic executed by the first processor, wherein the radio transceiver configuration logic configures the at least one radio communications transceiver to communicate with the at least one data service using parameters associated with the selected wireless network service provider; and a communications management station in communication with the mobile platform, the communications management station comprising: a second processor couple to a second memory; a communications service selection logic executed by the second processor, wherein the communications service selection logic is configured to dynamically designate the selected wireless network service provider by: determining when there is a positive balance of unutilized allowance for at least one of a plurality of available wireless network service providers; when there is a positive balance of unutilized allowance, designating one service provider from the plurality of available wireless network service providers as the selected wireless network service provider based at least in part on the unutilized allowance; and communicating the selected wireless network service provider to the radio transceiver configuration logic.

Example 17 includes the system of example 16, wherein when no wireless network of the plurality of available wireless network service providers has a positive balance of unutilized allowance, the available wireless network service provider having a lowest cost per data unit is designated as the selected wireless network service provider.

Example 18 includes the system of any of examples 16-17, further comprising communications service subscription allowance and fee data stored in the second memory, and communications service utilization data stored in the first memory; wherein the communications service subscription allowance and fee data includes: a total allowance allocation associated with at least one of the plurality of available wireless network service providers; and a cost per data unit usage fee schedule for each of the plurality of available wireless network service providers; and wherein the communications service utilization data indicates how much of the total allowance allocation has been consumed for the one of the plurality of available wireless network service providers.

Example 19 includes the system of any of examples 16-18, wherein the communications service selection logic designates the selected wireless network service provider further based at least in part on a scheduled expiration of the unutilized allowance.

Example 20 includes the system of any of examples 16-19, wherein the mobile platform comprises an aircraft and the first processor comprises at least part of either an aircraft communications management function or an aircraft communications management system and the data service comprises an aircraft communications addressing and reporting system (ACARS).

In various alternative embodiments, system and/or device elements, method steps, or example implementations described throughout this disclosure (such as but not limited to any of the Mobile Platforms, Mobile Communication System, Radio Transceiver Configuration Logic, Communications Service Selectin Logic, Transceivers, Networks, Data Services, Applications, or sub-parts of any thereof, for example) may be implemented at least in part using one or more computer systems, field programmable gate arrays (FPGAs), or similar devices comprising a processor coupled to a memory and executing code to realize those elements, processes, or examples, said code stored on a non-transient hardware data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

As used herein, terms such as "network", "system", "logic", "manager", "processor", "transceiver", "circuit", "memory", "service" each refer to non-generic elements that would be recognized and understood by those of skill in the art and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A mobile communication system, the system comprising:
    a communications processor coupled to a memory;
    at least one radio communications transceiver coupled to the communications processor, wherein the communications processor is configured to establish a communications link with at least one data service via the at least one radio communications transceiver over a selected wireless network service provider;
    a communications service selection logic executed by the communication processor, wherein the communications service selection logic dynamically designates the selected wireless network service provider by:
        determining when there is a positive balance of an unutilized allowance for at least one of a plurality of available wireless network service providers; and
        when there is a positive balance of unutilized allowance, then the communications service selection logic designates one service provider as the selected wireless network service provider based at least in part on the unutilized allowance; and
    a radio transceiver configuration logic executed by the communications processor, wherein the radio transceiver configuration logic configures the at least one wireless radio communications transceiver to communicate with the at least one data service using parameters associated with the selected wireless network service provider;
    wherein the communications processor comprises at least part of either an aircraft communications management function or an aircraft communications management system and the data service comprises an aircraft communications addressing and reporting system (ACARS).

2. The system of claim 1, wherein when no wireless network service provider of the plurality of available wireless network service providers has a positive balance of unutilized allowance, the available wireless network service provider having a lowest cost per data unit is designated by the communications service selection logic as the selected wireless network service provider.

3. The system of claim 1, further comprising communications service subscription allowance and fee data, wherein the communications service subscription allowance and fee data includes:
    a total allowance allocation associated with at least one of the plurality of available wireless network service providers; and
    a cost per data unit usage fee schedule for each of the plurality of available wireless network service providers;
    wherein the communications service subscription allowance and fee data is either stored in the memory or received via an uplink communication.

4. The system of claim 3, further comprising communications service utilization data, wherein the communications service utilization data indicates how much of the total allowance allocation has been consumed for the one of the plurality of available wireless network service providers;

wherein the communications service utilization data is either stored in the memory or received via an uplink communication.

5. The system of claim 1, wherein the at least one radio communications transceiver comprises at least one of a very high frequency (VHF) transceiver, a satellite communications transceiver, an IEEE 802.11 standard (WiFi) radio, an IEEE 802.15 standard (Bluetooth) radio, a High Frequency Data Radio (HFDR), a Gatelink technology radio, a cellular telephone technology, Aeronautical Mobile Airport Communication System (AeroMACS), or a proprietary network technology.

6. The system of claim 1, wherein the communications service selection logic designates the selected wireless network service provider further based at least in part on a scheduled expiration of the unutilized allowance.

7. The system of claim 1, wherein the radio transceiver configuration logic sends a control signal to the at least one radio communication transceiver that reconfigures the at least one radio communication transceiver to use a designated frequency, a designated set of frequencies, or a modulation protocol associated with the selected wireless network service provider.

8. A method for a mobile communication system, the method comprising:
   determining when there is there a positive balance of an unutilized allowance for at least one of a plurality of available wireless network service providers;
   when there is a positive balance of an unutilized allowance, designating one service provider from the plurality of available wireless network service providers as a selected wireless network service provider based at least in part on the unutilized allowance; and
   adjusting operation of one or more radio communication transceivers to establish a communication link via the selected wireless network service provider;
   wherein the mobile communications system comprises at least part of either an aircraft communications management function or an aircraft communications management system and the data service comprises an aircraft communications addressing and reporting system (ACARS).

9. The method of claim 8, wherein when there is no positive balance of the unutilized allowance, designating as the selected wireless network service provider the available wireless network service provider having a lowest cost per data unit.

10. The method of claim 8, wherein determining when there is there a positive balance of an unutilized allowance for at least one of the plurality of available wireless network service providers comprises accessing communications service subscription allowance and fee data stored in a memory and accessing communications service utilization data stored in the memory;
   wherein the communications service subscription allowance and fee data includes:
      a total allowance allocation associated with at least one of the plurality of available wireless network service providers; and
      a cost per data unit usage fee schedule for each of the plurality of available wireless network service providers; and
   wherein the communications service utilization data indicates how much of the total allowance allocation has been consumed for the one of the plurality of available wireless network service providers.

11. The method of claim 8, wherein the one or more radio communications transceiver comprises at least one of a very high frequency (VHF) transceiver, a satellite communications transceiver, an IEEE 802.11 standard (WiFi) radio, an IEEE 802.15 standard (Bluetooth) radio, a High Frequency Data Radio (HFDR), a Gatelink technology radio, a cellular telephone technology, Aeronautical Mobile Airport Communication System (AeroMACS), or a proprietary network technology.

12. The method of claim 8, wherein designating one service provider from the plurality of available wireless network service providers as a selected wireless network service provider is further based at least in part on a scheduled expiration of the unutilized allowance.

13. The method of claim 8, wherein adjusting operation of one or more radio communication transceivers to establish a communication link via the selected wireless network service provider comprises:
   sending a control signal to the at least one radio communication transceiver that reconfigures the at least one radio communication transceiver to use a designated frequency, a designated set of frequencies, or a modulation protocol associated with the selected wireless network service provider.

14. A mobile communication system, the system comprising:
   a mobile platform that comprises:
      a first processor coupled to a first memory;
      at least one radio communications transceiver coupled to the communications processor, wherein the communications processor is configured to establish a communications link with at least one data service via the at least one radio communications transceiver over a selected wireless network service provider;
      a radio transceiver configuration logic executed by the first processor, wherein the radio transceiver configuration logic configures the at least one radio communications transceiver to communicate with the at least one data service using parameters associated with the selected wireless network service provider; and
   a communications management station in communication with the mobile platform, the communications management station comprising:
   a second processor couple to a second memory;
   a communications service selection logic executed by the second processor, wherein the communications service selection logic is configured to dynamically designate the selected wireless network service provider by:
      determining when there is a positive balance of unutilized allowance for at least one of a plurality of available wireless network service providers;
      when there is a positive balance of unutilized allowance, designating one service provider from the plurality of available wireless network service providers as the selected wireless network service provider based at least in part on the unutilized allowance; and
      communicating the selected wireless network service provider to the radio transceiver configuration logic;
   wherein the mobile platform comprises an aircraft and the first processor comprises at least part of either an aircraft communications management function or an aircraft communications management system and the data service comprises an aircraft communications addressing and reporting system (ACARS).

15. The system of claim 14, wherein when no wireless network of the plurality of available wireless network service providers has a positive balance of unutilized allowance, the available wireless network service provider having a lowest cost per data unit is designated as the selected wireless network service provider.

16. The system of claim 14, further comprising communications service subscription allowance and fee data stored in the second memory, and communications service utilization data stored in the first memory;
   wherein the communications service subscription allowance and fee data includes:
      a total allowance allocation associated with at least one of the plurality of available wireless network service providers; and
      a cost per data unit usage fee schedule for each of the plurality of available wireless network service providers; and
   wherein the communications service utilization data indicates how much of the total allowance allocation has been consumed for the one of the plurality of available wireless network service providers.

17. The system of claim 14, wherein the communications service selection logic designates the selected wireless network service provider further based at least in part on a scheduled expiration of the unutilized allowance.

\* \* \* \* \*